J. W. CRUSIUS
SOFT TREAD TIRE.
APPLICATION FILED MAY 24, 1912.
1,099,282.
Patented June 9, 1914.
2 SHEETS—SHEET 1.
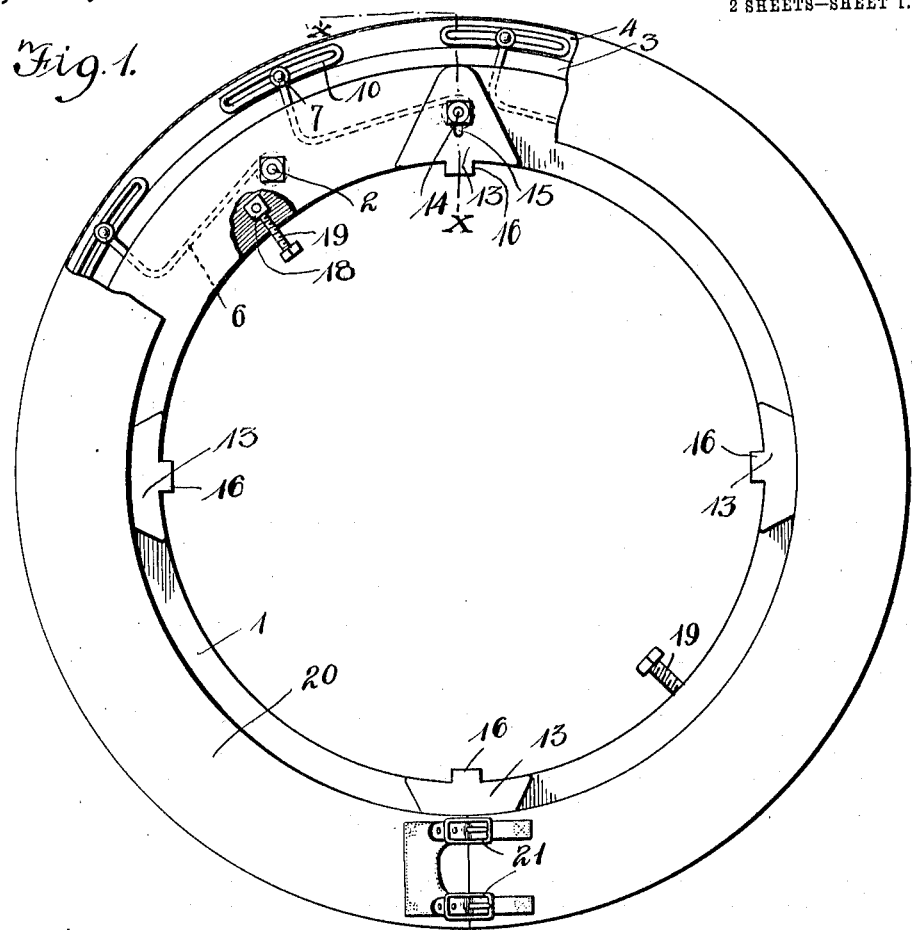
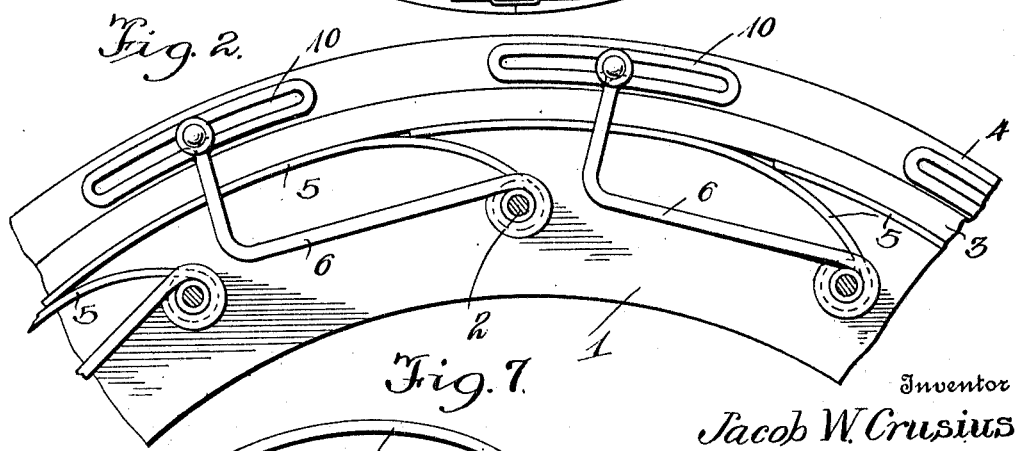
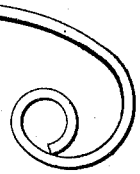
Witnesses
E. O. Crocker
U. B. Hillyard
Inventor
Jacob W. Crusius
By Victor J. Evans
Attorney J. W. CRUSIUS.
SOFT TREAD TIRE.
APPLICATION FILED MAY 24, 1912.
1,099,282.
Patented June 9, 1914.
2 SHEETS—SHEET 2.
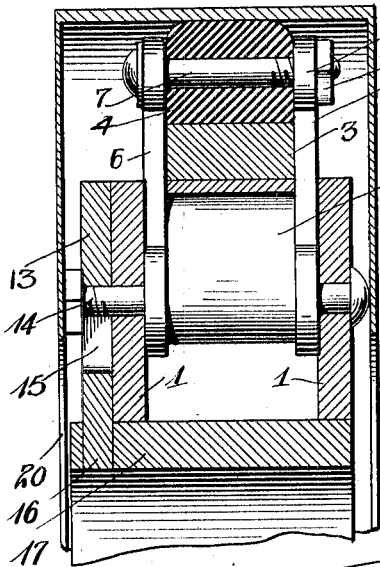
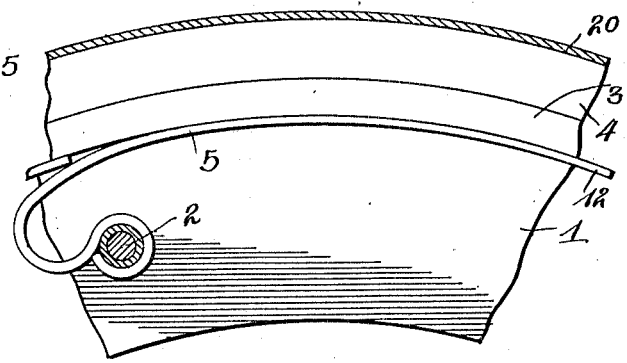
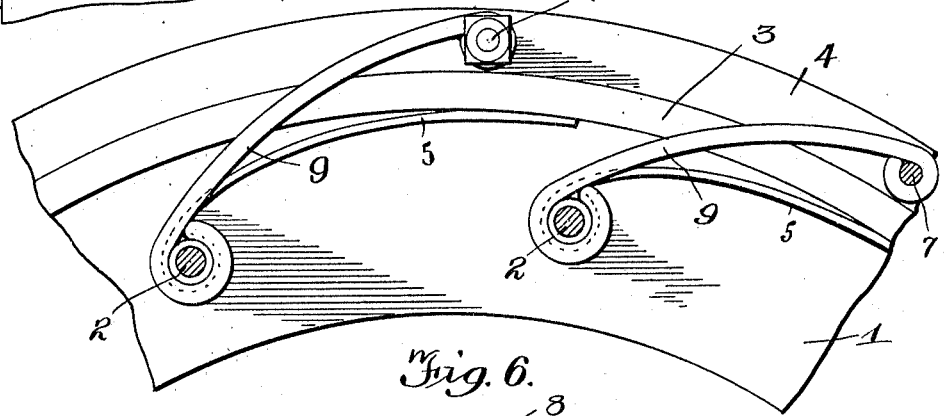
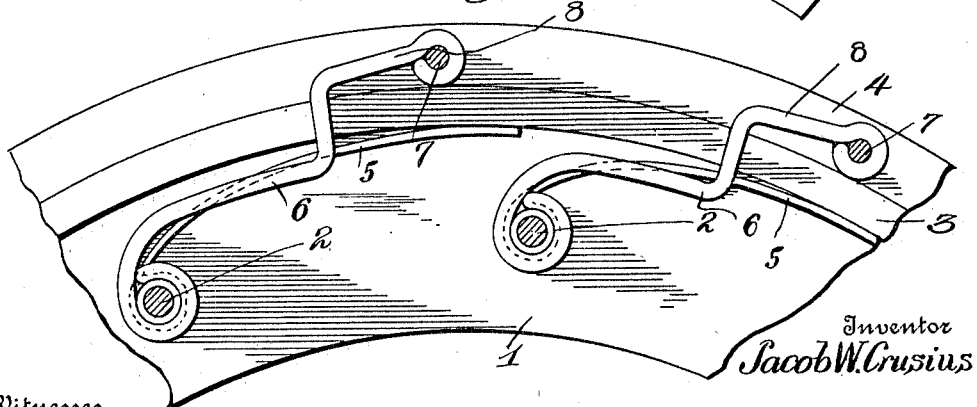
Inventor
Jacob W. Crusius
Witnesses
E. O. Crocker
V. B. Hillyard
By Victor J. Evans
Attorney

UNITED STATES PATENT OFFICE.

JACOB W. CRUSIUS, OF PAULDING, OHIO.

SOFT-TREAD TIRE.

1,099,282. Specification of Letters Patent. Patented June 9, 1914.

Application filed May 24, 1912. Serial No. 699,429.

*To all whom it may concern:*

Be it known that I, JACOB W. CRUSIUS, a citizen of the United States, residing at Paulding, in the county of Paulding and State of Ohio, have invented new and useful Improvements in Soft-Tread Tires, of which the following is a specification.

The invention provides a yieldable tire which may be quickly fitted to vehicle wheels of standard sizes, said tire approximating the resiliency afforded by the pneumatic tire so as to render riding comfortable and at the same time prevent excessive wear to the vehicle and the motor in the event of the vehicle being mechanically propelled.

The invention contemplates a yieldable tread, a rigid rim and intermediate cushioning and lateral supporting and bracing devices, the yieldable tread preventing jar when the tire passes over a stone or other similar projection in the path of the vehicle wheel.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a soft tread tire embodying the invention, a portion of the casing being broken away. Fig. 2 is a detail view of a portion of the tire having the near ring removed. Fig. 3 is a transverse section about on the line $x$—$x$ of Fig. 1, showing the means for attaching the tire and the rim of a vehicle wheel of the automobile type. Fig. 4 shows a modified form of spring forming cushioning means between the rim and tread. Fig. 5 is a modification, showing a different form of brace and connector for retaining the tread in place. Fig. 6 shows a further modification of the means for bracing and connecting the tread to the rim. Fig. 7 shows a further modified form of spring.

Corresponding and like parts are referred to in the following description, and indicated in all the views of the drawings, by the same reference characters.

The tire comprises a relatively rigid rim and a yieldable tread. The rim embodies two rings 1 which are spaced apart and connected by means of bolts 2 or like fastenings. The tread portion is formed of yieldable material so as to give when passing over a stone or like obstruction and generally consists of an inner portion 3 of leather or analogous material and an outer portion 4 of rubber or similar material and which constitutes the tire proper. A plurality of springs 5 are interposed between the rim and tread portions of the tire. Each of the springs is approximately of U form, one member being considerably longer than the other, the short member being arranged near the inner side of the tire and the long member being arranged adjacent the inner side of the inner portion 3 to form a support for the tread. The short member of the spring terminates in an eye through which one of the bolts or fastenings 2 passes. The longer or outer members of the springs 5 overlap so as to mutually support one another at their outer ends as well as to support the tread portion of the tire at every point. The springs 5 are constructed of strips of flat spring metal and while the U form is preferred it is manifest that the springs may have any desired outline so long as their inner ends are connected with the rim and their outer ends overlap and unitedly form a continuous support for the tread portion of the tire.

The tread portion of the tire is arranged opposite the space formed between the rings 1 and is retained in place by means of combined braces and connectors 6 which have their inner ends engaged by means of the bolts or fastenings 2 and their outer ends secured to the tread portion of the tire by means of bolts or fastenings 7, which pass through openings formed in said tread portion and through openings at the outer ends of the parts 6. The inner portions of the parts 6 engage the inner sides of the rings 1 and are spaced apart by means of the springs 5 and the eyes through which the fastenings 2 pass. The outer ends of the parts 6 extend along opposite sides of the tread portion of the tire, thereby bracing the same laterally against transverse strain. The parts 6 have a limited movement to admit of the tread portion of the tire yielding in the plane of the wheel so as to compensate for shock and vibration to attain all the advantages incident to the use of the pneumatic tire. In the preferred construction of the parts 6 they are of approximately L form, one member having a radial arrangement and the other member extending in the circumferential length of the rim. In the form shown in Fig. 6 the outer end of the radial member is curved, as indicated at 8, thereby providing an extended bearing between the outer ends of the springs and the tread portion of the tire. The combined brace and connector may be curved throughout its length, as indicated at 9 in Fig. 5, said part having eyes at both ends to receive the fastenings 2 and 7.

In Fig. 2 a modified form of brace and connector is shown in which the outer end of the member placed along side of the tread terminates in an elongated loop 10 through which a fastening 7 passes, such construction admitting of the connector supporting the tire for an appreciable part of its length. The springs may be differently formed as hereinbefore stated and as shown in Fig. 2, each of the springs 5 is curved and has an eye or roll at its inner end to receive a bolt or fastening 2. In the modification shown in Fig. 7 each of the springs 12 has its inner end of an involute form and terminating in an eye or roll through which a bolt or fastening 2 passes for connecting the spring to the rim portion of the tire.

It is contemplated to construct tires in accordance with this invention in standard sizes both as to diameter and tread and these tires are designed to be fitted to the rims of automobile or other vehicle wheels and are adapted to be secured in place in various ways. As shown lock plates are secured to the outer side of one of the rims 1 by means of bolts 14, the latter passing through radial slots 15 formed in the lock plates 13 and said lock plates having lugs 16 at their inner edges to pass through openings in the rim 17 of the automobile or other vehicle wheel. The lock plates 13 may be supplemented by other fastening means or such fastening means may be used independently of the lock plates, the same consisting of a nut 18 and a screw 19, the latter being designed to pass through an opening in the rim 17 of the automobile or vehicle wheel and making screwthread connection with the nut 18, which latter has trunnions at its ends which pass through transverse openings formed in the rings 1. When the screws 19 are removed and the bolts 14 loosened and the lock plates 13 moved outwardly the tire as a whole may be slipped upon or removed from the wheel, as will be readily understood.

A casing 20 embraces opposite sides of the tire and encircles the same and prevents dust, mud, sand, slush and the like from finding its way into the space between the rings 1 and between the rim and the tread portion of the tire, thereby interfering with the free action of the springs and the combined braces and connectors 6. This casing may be constructed of leather, fabric or any other suitable material best adapted for the purpose. The casing is constructed in annular form and is split to enable it to be easily fitted to or removed from the tire and when in position is made secure by means of short straps and buckles 21 in the manner well understood.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination a rim, transversely spaced rings mounted upon the rim and secured thereto, a yieldable tread encircling the rim, braces between the tread and rings and having their outer ends embracing opposite sides of the tread and their inner ends in contact with the inner faces of the rings, bolts connecting the inner ends of the braces with the rings, other bolts connecting the outer ends of the braces with the tread, and flat springs of a width equal to the distance between opposed braces, said springs having eyes at their inner ends to receive the bolts supported in the rings and the outer ends of the springs being arranged to overlap and engage the inner side of the tread to form a yielding support therefor.

In testimony whereof I affix my signature in presence of two witnesses.

JACOB W. CRUSIUS.

Witnesses:
C. A. DICKISON,
A. R. GEYER.

---

Copies of this patent may be obtained for five cents each, by addressing the "Commissioner of Patents, Washington, D. C."